(12) United States Patent
Thiele et al.

(10) Patent No.: US 7,374,402 B2
(45) Date of Patent: May 20, 2008

(54) FASTENING ARRANGEMENT FOR AN IMPELLER ON A SHAFT

(75) Inventors: Martin Thiele, Baden-Rütihof (CH); Janpeter Kühnel, Bülach (CH); Josef Bättig, Egliswil (CH)

(73) Assignee: ABB Turbo Systems AG, Baden (CH)

( * ) Notice: Subject to any disclaimer, the term of this patent is extended or adjusted under 35 U.S.C. 154(b) by 223 days.

(21) Appl. No.: 10/512,581

(22) PCT Filed: May 5, 2003

(86) PCT No.: PCT/CH03/00287

§ 371 (c)(1),
(2), (4) Date: May 26, 2005

(87) PCT Pub. No.: WO03/093651

PCT Pub. Date: Nov. 13, 2003

(65) Prior Publication Data

US 2005/0232775 A1  Oct. 20, 2005

(30) Foreign Application Priority Data

May 6, 2002 (CH) .................................. 0808/02

(51) Int. Cl.
  *F04D 29/20* (2006.01)
(52) U.S. Cl. .............................. 416/204 R; 416/204 A
(58) Field of Classification Search ............ 416/204 R, 416/204 A, 244 R, 244 A, 185, 213 R
  See application file for complete search history.

(56) References Cited

U.S. PATENT DOCUMENTS

| 2,441,432 A | 5/1948 | McGee |
| 2,799,445 A | 7/1957 | Hull |
| 5,209,595 A | 5/1993 | Hyll |
| 5,961,247 A | 10/1999 | Gold et al. |
| 6,948,913 B2 | 9/2005 | Heyes et al. |

FOREIGN PATENT DOCUMENTS

DE  499 929  6/1930

(Continued)

OTHER PUBLICATIONS

Excerpt from "Diesel and Gas Turbine catalog 1998", EGT 297, State of the Art.

(Continued)

*Primary Examiner*—Edward K. Look
*Assistant Examiner*—Dwayne J White
(74) *Attorney, Agent, or Firm*—Buchanan Ingersoll & Rooney PC

(57) ABSTRACT

The fastening arrangement (26) for an impeller (22) on a shaft (14), in particular for an impeller (22) of a turbocharger on a turbocharger shaft (14), comprises a bush (34), which can be screwed onto a shaft journal (20) of the shaft (14), and a shaft-side hub extension (30) of the impeller (22) having a central recess (32), into which the bush (34) can be inserted in a frictional manner. The hub extension (30), at least in the region of its shaft-side end, is designed approximately in the form of a hollow cylinder. The fastening arrangement (26) also comprises a press sleeve (36) which can be frictionally connected radially on the outside to the hub extension (30).

22 Claims, 3 Drawing Sheets

FOREIGN PATENT DOCUMENTS

| | | |
|---|---|---|
| DE | 581 731 | 8/1933 |
| DE | 41 41 427 A1 | 6/1993 |
| FR | 858 154 | 11/1940 |
| FR | 1 075 901 | 10/1954 |

OTHER PUBLICATIONS

"Turbochargers from European Gas Turbines—A Major player in the Turbocharger world.", *Diesel & Gas Turbine Worldwide Catalog*, 1998, pp. 686-687.

FASTENING ARRANGEMENT FOR AN IMPELLER ON A SHAFT

TECHNICAL FIELD

The invention relates to a fastening arrangement for an impeller on a shaft, in particular for an impeller of a turbocharger on a turbocharger shaft, according to the preamble of patent claim 1.

BACKGROUND INFORMATION

In high-speed machines, such as, for example, in high-speed fluid-flow machines, the connection between the impellers and the shaft must satisfy stringent requirements. These connections must be absolutely rotationally fixed at high speeds, despite the high forces which occur, they must be able to transmit high torques and have a long service life, but must nonetheless often be releasable for maintenance purposes.

Various possible ways of realizing such connections have been proposed. Thus, the impeller, for example, may be provided with a continuous central bore and the shaft may be provided with a tapped hole, so that the impeller can then be screwed on with a clamping screw. Or the impeller, on its side facing the shaft, is provided with a blind hole having an internal thread, and a threaded stem having a matching external thread is provided on the shaft end, so that the impeller can be screwed directly onto the shaft. Since the impellers are often produced from a material different from that of the shaft, problems repeatedly occur with these screwed connections on account of different coefficients of expansion of the materials, a factor which may lead to rotor unbalance during operation. The softer material may also sustain damage during repeated release and tightening in the region of the thread. Furthermore, "fretting" of the threads may occur. Thread furrows which are made directly in the hub of the impeller or in the shaft may lead to unfavorable notch effects in the components, a factor which may lead to the fracture of the hub in the case of threads in the hub. This is a very big problem in turbochargers having ram induction, the impellers of which are subjected to considerable torque fluctuations.

In order to avoid the problems caused by the threads, it has been proposed in the case of impellers screwed directly to the shaft to arrange a bush between the shaft and the impeller. Such a connection is known, for example, from Napier EGT 297 from "Diesel and Gas Turbine Catalog 1998, Volume 63; Page 686". In this example, the compressor wheel of a turbocharger is provided on the shaft side with a hub extension which has a central blind hole. A bush is frictionally inserted into this blind hole. This bush has an axially extending bush part and, on the shaft side, an annular bush flange which projects radially outward therefrom and has approximately the same outside diameter as the end face of the hub extension. The bush part is dimensioned in such a way that it extends just up to the base of the blind hole when the bush flange is brought to bear against the end face of the hub extension. Two cylindrical recesses lying axially one behind the other are provided in the bush part, the impeller-side cylindrical recess having a smaller diameter than the shaft-side cylindrical recess and being provided with an internal thread. Formed between the two recesses is a shoulder which, in interaction with the shoulder of the shaft journal designed to be diametrically opposed to the inside of the bush, serves for centering the compressor wheel relative to the shaft. During assembly, first of all the bush is inserted frictionally into the central recess of the compressor wheel and then the compressor wheel together with the bush is screwed onto the shaft journal of the turbocharger shaft. The compressor wheel itself has no thread and is thus freed of the notch stresses. In addition, given appropriate selection of the bush material, the problem of the different coefficients of expansion and of the fretting and also of the damage to the softer thread during repeated release and tightening can be reduced or completely removed. In this design, the blind hole and end face of the hub extension, the bush together with flange, shoulder and thread, and also the shaft journal together with thread and shoulder must be worked very accurately, which is complicated and expensive.

In addition, this design leads to large leakage flows. Nonetheless, such a connection cannot be used for connections in which very high torques or high torque fluctuations have to be transmitted between impeller and shaft, as is the case, for example, in turbochargers having ram induction, since the torque transmission is inadequate.

SUMMARY

The object of the invention is therefore to provide a fastening arrangement for an impeller on a shaft, in particular for the impeller of a turbocharger on a turbocharger shaft, which fastening arrangement avoids the abovementioned disadvantages and permits the transmission of even very high torques and/or large torque fluctuations.

This object is achieved by a fastening arrangement for an impeller on a shaft having the features of patent claim 1.

The fastening arrangement according to the invention, in addition to the abovedescribed, known hub extension with central recess on the shaft side of the impeller and the bush which can be inserted frictionally into the hub extension and can be screwed onto the shaft, also has a press sleeve which can be frictionally connected radially on the outside to the hub extension. For this purpose, the hub extension is designed approximately in the shape of a hollow cylinder at least in the region of its shaft-side end, although its radially outer side may also be designed to taper slightly conically on the shaft side. Such a conical design is especially suitable as a press fit. Higher torques and also larger torque fluctuations can be absorbed by the outer press sleeve.

If the impeller, in the fitted state, is separated on the shaft side from the bearing housing by means of a fixed housing component, and if this housing component engages on the shaft side radially inward behind the hub extension together with bush and press sleeve, the leakage flows can be reduced. It is helpful here if an auxiliary bearing disk is arranged axially between thrust bearing and hub extension and in the fitted state preferably bears against part of the bush or part of the press sleeve.

A further reduction in the leakage flows can be achieved by a seal, preferably a labyrinth seal, being provided between press sleeve and housing component and/or between bush and housing component. To this end, those sides of the press sleeve and/or bush which are adjacent to the housing component are advantageously designed at least partly as the one part of a labyrinth seal, and that side of the housing component which faces the shaft journal is advantageously designed at least partly as the other part of the labyrinth seal.

If one or more centering surfaces are provided on the outer circumference of the shaft journal, these centering surfaces interacting in a centering manner with one or more centering surfaces on the inner circumference of the bush, simple and very accurate centering can be achieved. Threads are arranged on the outer circumference of the shaft journal and the inner circumference of the bush axially adjacent to the centering surfaces, these threads interacting in a positive-locking manner and producing a rotationally fixed connection between impeller and shaft. It is advantageous if the axial extent of the thread corresponds approximately to one third to two thirds of the radially inner axial extent of the bush.

For good seating, the bush has sections having a different inside diameter which are axially one behind the other, decrease toward the impeller and are designed to be diametrically opposed to the shaft journal. If the internal thread of the bush for screwing onto the shaft journal is arranged on a section of a large inside diameter of the bush, this has a positive effect on the transmission of torques and torque fluctuations.

In addition to an axially extending sleeve part, the bush and/or press sleeve advantageously have/has an annular flange which projects radially outward or respectively radially inward and which, in the fitted state, bears against the shaft-side end face of the hub extension. These flanges engage with one another radially in the fitted state. If only the press sleeve or the bush has a flange, this flange preferably extends radially in such a way that it engages behind the bush sleeve of the bush or the sleeve part of the press sleeve.

Further preferred embodiments are the subject matter of further dependent patent claims.

BRIEF DESCRIPTION OF THE DRAWINGS

The subject matter of the invention is explained in more detail below with reference to preferred exemplary embodiments which are shown in the attached drawings, in which, purely schematically.

Figure 1:
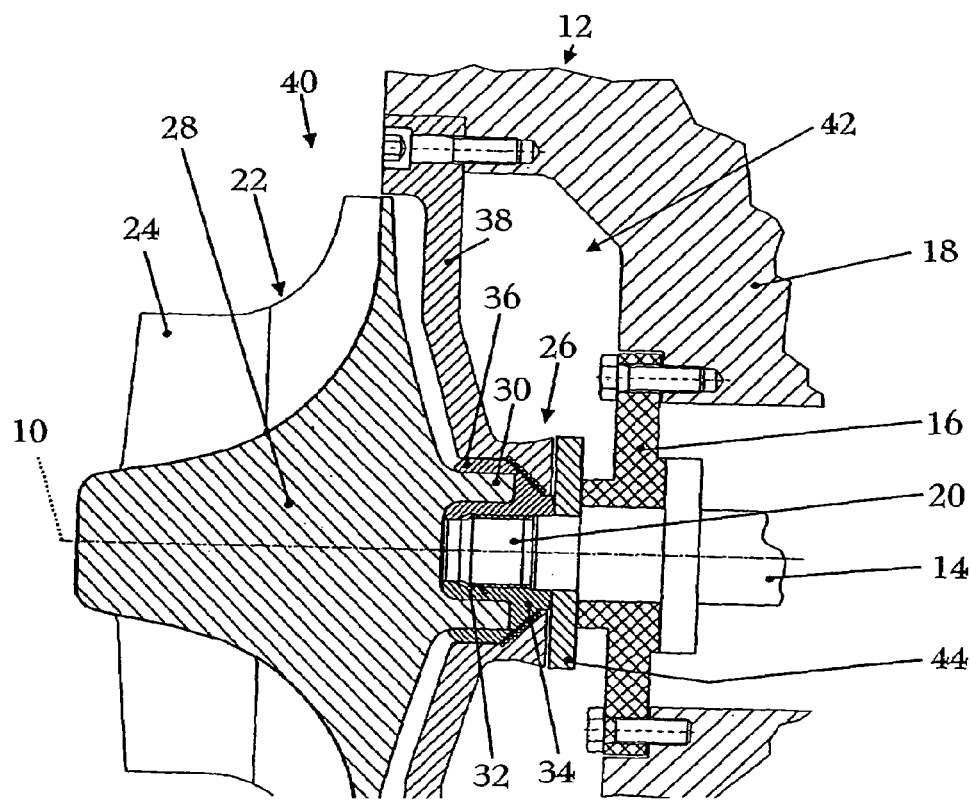
FIG. 1 shows a compressor-side detail of a turbocharger with a compressor wheel fastened to a turbocharger shaft by means of a fastening arrangement according to the invention.

The designations used in the drawings and their meaning are listed together in the list of designations. In principle, the same parts are provided with the same designations in the figures. The embodiment described represents the subject matter of the invention by way of example and has no restricting effect.

DETAILED DESCRIPTION

FIG. 1, as an example of a means of fastening an impeller 22 to a shaft 14, shows a detail of a fluid-flow machine. Shown along its longitudinal axis 10 is a detail of a turbocharger on its compressor side 12. On the compressor side, a turbocharger shaft 14 is mounted radially and axially in a bearing element 16 which is supported in a bearing housing 18. The shaft 14 has a shaft journal 20, which projects from the bearing element 18 on the impeller side. The shaft journal 20 carries a compressor wheel as impeller 22 with moving blades 24. The impeller/compressor wheel 22 is fastened on the shaft journal 20 by means of a fastening arrangement 26 according to the invention. The impeller 22 comprises a hub 28, on which the moving blades 24 are arranged. The hub 28 is provided on the shaft side with a hub extension 30, which has a central recess 32 and is designed in the region of its shaft-side end approximately in the shape of a hollow cylinder. A bush 34 is frictionally inserted into the recess 32 and is screwed onto the shaft journal 20. Frictionally arranged radially on the outside on the hub extension 30 is a press sleeve 36, which provides for very good torque transmission. An intermediate wall 38 of the turbocharger, this intermediate wall 38 being fixed to the bearing housing 18 and separating the compressor space 40 from the bearing space 42 of the turbocharger, encloses the hub extension 30 together with bush 34 and press sleeve 36 along the circumference and partly engages behind them. An auxiliary bearing disk 44 is provided axially between the hub extension 30, together with bush 34 and press sleeve 36, and the bearing element 16. In the example shown here, this auxiliary bearing disk 44 bears axially against part of the bush 34.

Figure 2:
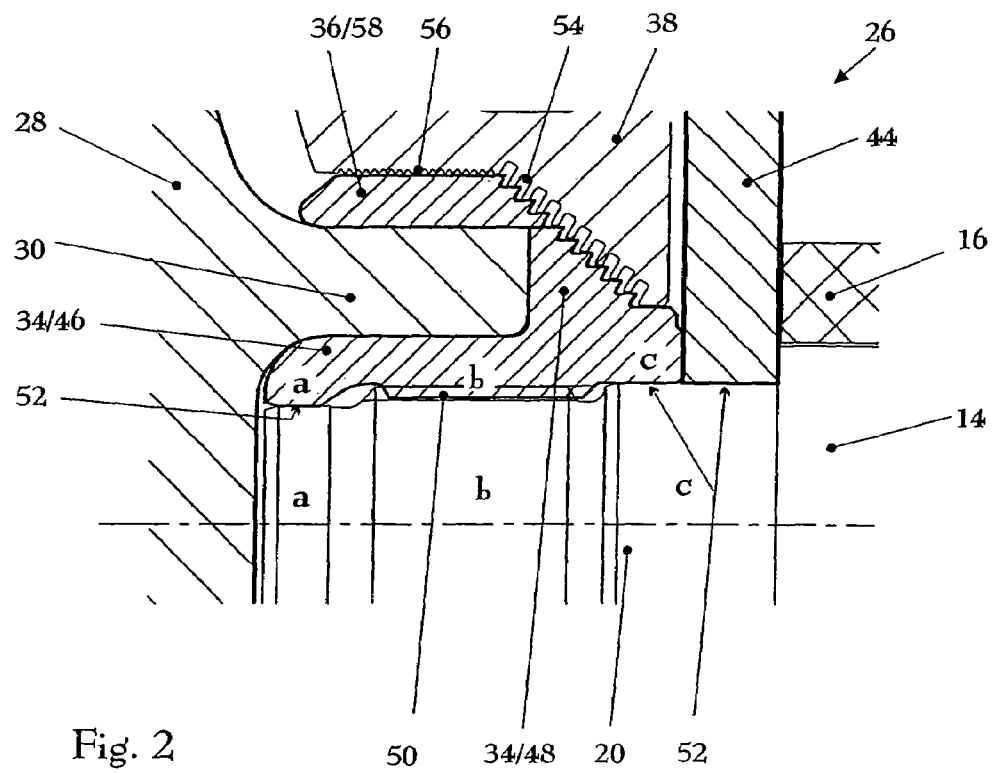
FIG. 2 shows an enlarged detail from FIG. 1 with the fastening arrangement according to the invention in a first embodiment variant.

FIG. 2 shows the fastening arrangement 26 according to the invention from FIG. 1 in detail. As can be seen, the bush 34 has a bush sleeve 46 extending in the axial direction and an annular flange 48 which projects radially outward and has a side inclined toward the axis 10 and facing the intermediate wall 38. In the fitted state, the flange 48 bears against the shaft-side end face of the hub extension 30 and has the same outside diameter as the hollow-cylindrical hub extension 30. In this way, the flange 48 can be fitted so as to abut against the radially inner side of the press sleeve 36, which in this example only has an axially extending sleeve part 58. The bush 34 has three sections a, b, c of different inside diameter which lie axially one behind the other and decrease toward the impeller 22. The shaft journal 20 has three sections a, b, c of diametrically opposed design and having outside diameters decreasing toward the impeller, so that shaft journal 20 and bush 34 readily fit into one another. The center section b of the three sections is provided with a thread 50 for screwing the bush 34 onto the shaft journal 20. In the region of the sections a and b, centering surfaces 52, which interact in a centering manner, are provided on the inner circumference of the bush 34 and on the outer circumference of the shaft journal 20. The axial extent of the thread 50 corresponds approximately to half the radially inner axial extent of the bush 34. As can be seen from FIG. 2, the shaft-side centering surface 52 in section c of the shaft journal 20, which centering surface 52 interacts with the centering surface 52 of the section c of the bush 34, extends axially in the direction of the bearing element 16 beyond the section c of the bush 34 and thus serves as a centering seat for the auxiliary bearing 44.

The labyrinth seal 54 formed between press sleeve 36 and intermediate wall 38 and also between bush 34 and intermediate wall 38 can also be readily seen. The sides of press sleeve 36 and bush 34 which are adjacent to the intermediate wall 38 and are inclined toward the longitudinal axis 10 are designed as the one part of the labyrinth seal 54, and that side of the intermediate wall 38 which faces the shaft journal 20 and is inclined toward the longitudinal axis is designed as the other part of the labyrinth seal 54. In this special case, the radially outer side, extending parallel to the longitudinal axis, of the press sleeve 36 is designed without labyrinth serrations 56, whereas the opposite side of the intermediate wall 38 has such serrations 56. The combination of the various technical measures together leads to optimum protection from leakage flows from the compressor space 40: an intermediate wall 38 engaging behind the hub extension 30 with press sleeve 36 and bush 34, a sealing auxiliary bearing 44 and the labyrinth seal 54. As can be seen from the further examples, however, it is also possible to realize only some of these measures independently of the others.

Figure 3:
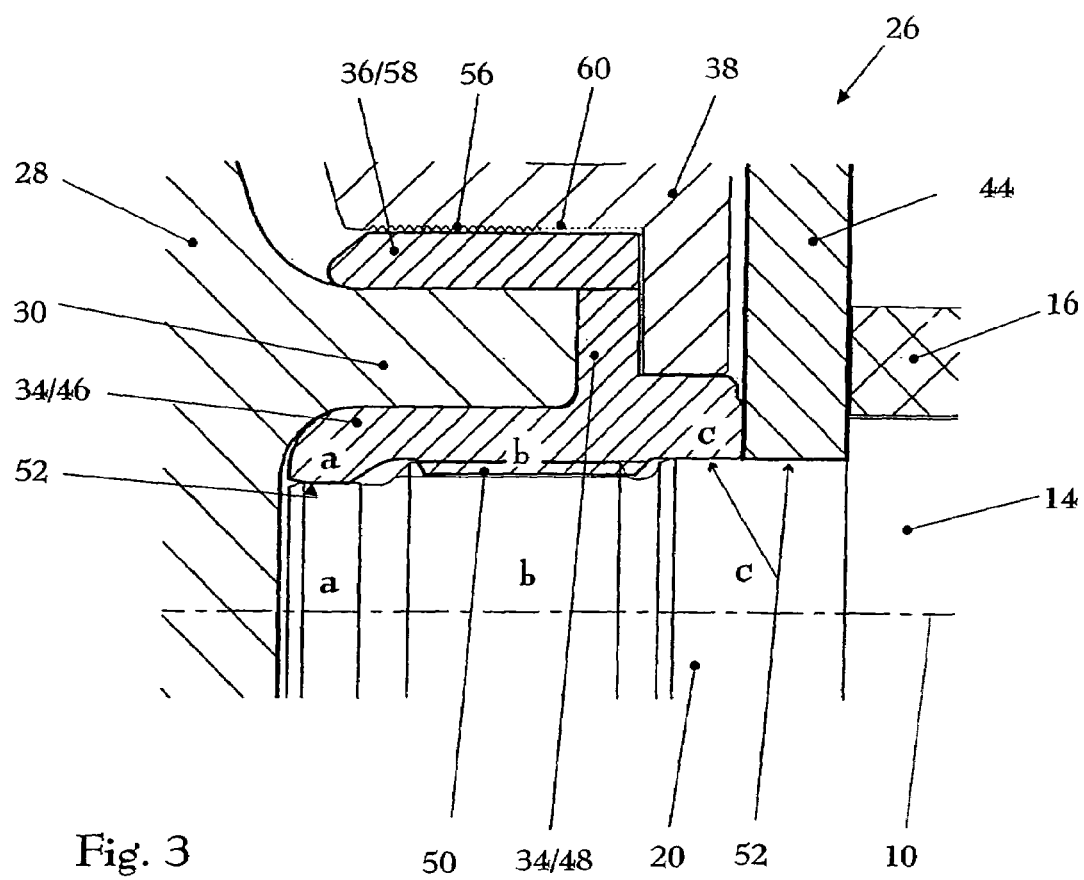
FIGS. 3 to 6 show, in an illustration analogous to the illustration of FIG. 2, various further embodiments of the fastening arrangement according to the invention.

FIG. 3 shows a fastening arrangement 26 according to the invention which is constructed like the one which is shown in FIGS. 1 and 2, but in which press sleeve 36, bush 34 and intermediate wall 38 have no side inclined toward the axis 10. No labyrinth seal 54 is provided. The radially outer side, extending parallel to the longitudinal axis 10, of the intermediate wall 38 may again have labyrinth serrations 56; however, it may also be designed without such serrations, as indicated in the shaft-side region 60 by the broken line. The opposite side of the press sleeve 36 is designed without labyrinth serrations 56.

The fastening arrangement 26 shown in FIG. 4 is again constructed in principle like the one from FIGS. 1 and 2. In this embodiment, however, not only does the bush 34 have an annular flange 48, the press sleeve 36 is also designed on the shaft side with an annular flange 62, which in the fitted state bears against the end face of the hub extension 30. The bush and the press sleeve are designed in such a way that the flanges 48, 62 approximately abut against one another after being pressed or shrunk onto the hub extension 30. Contrary to the embodiment shown in FIG. 3, however, the bush 34 could be designed without an annular flange 48, as indicated by the broken line 64, and instead the annular flange 62 of the press sleeve could extend radially inwards up to the inside diameter of the hollow-cylindrical hub extension 30. The intermediate wall 38 is not shown in this figure, but again forms together with press sleeve 36 and bush 34 the labyrinth seal 54. In this example, in contrast to the embodiments of the fastening arrangement 26 which are shown in FIGS. 1 to 3, the first section a of the shaft journal 20 is formed with a very much smaller outside diameter. Diametrically opposed to this, the bush 34, in its section a, is provided with a likewise much smaller inside diameter. This leads to lower notch stresses in the recess between section a and b. However, the surfaces of these sections a are again designed as centering surfaces 52.

Figure 4:
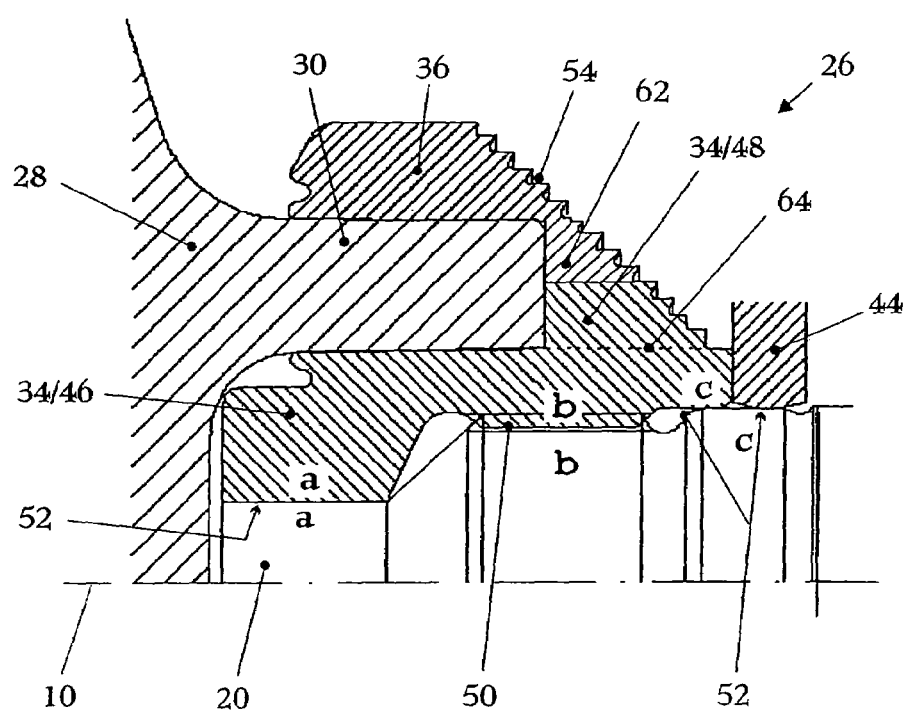
Figure 5:
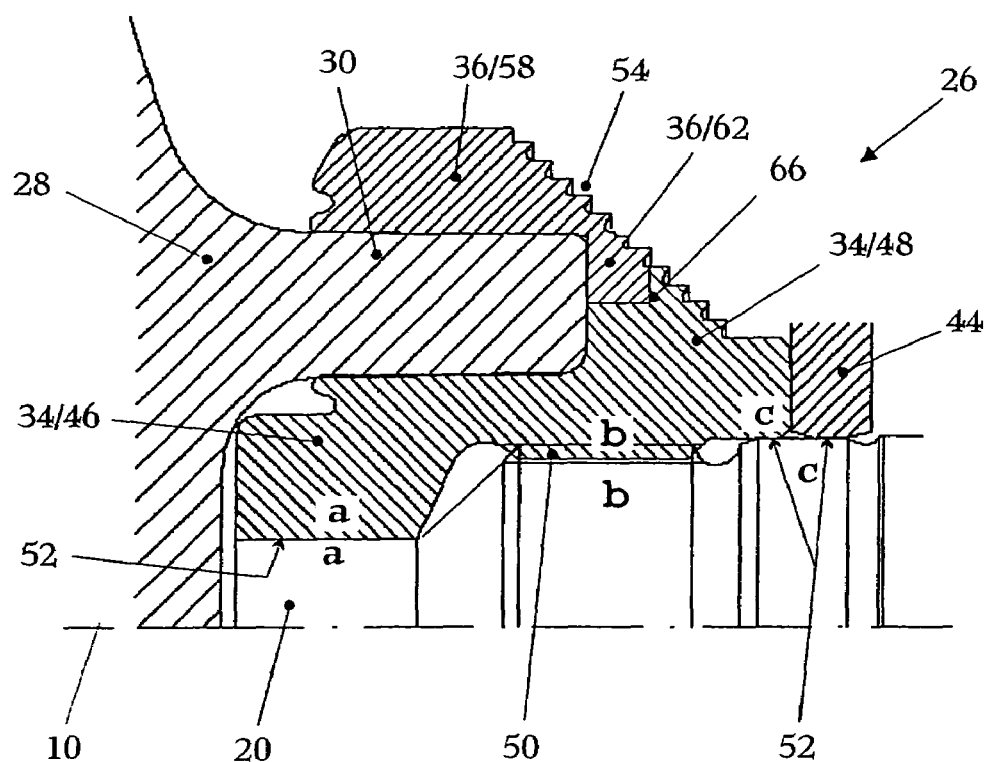

The embodiment of the fastening arrangement 26 shown in FIG. 5 is constructed like the one from FIG. 4, the two flanges 48, 62 of bush 34 and press sleeve 36 being arranged in an interlocking manner instead of in an abutting manner. For this purpose, the annular flange 48 of the bush 34 is provided with a shoulder 66.

Figure 6:
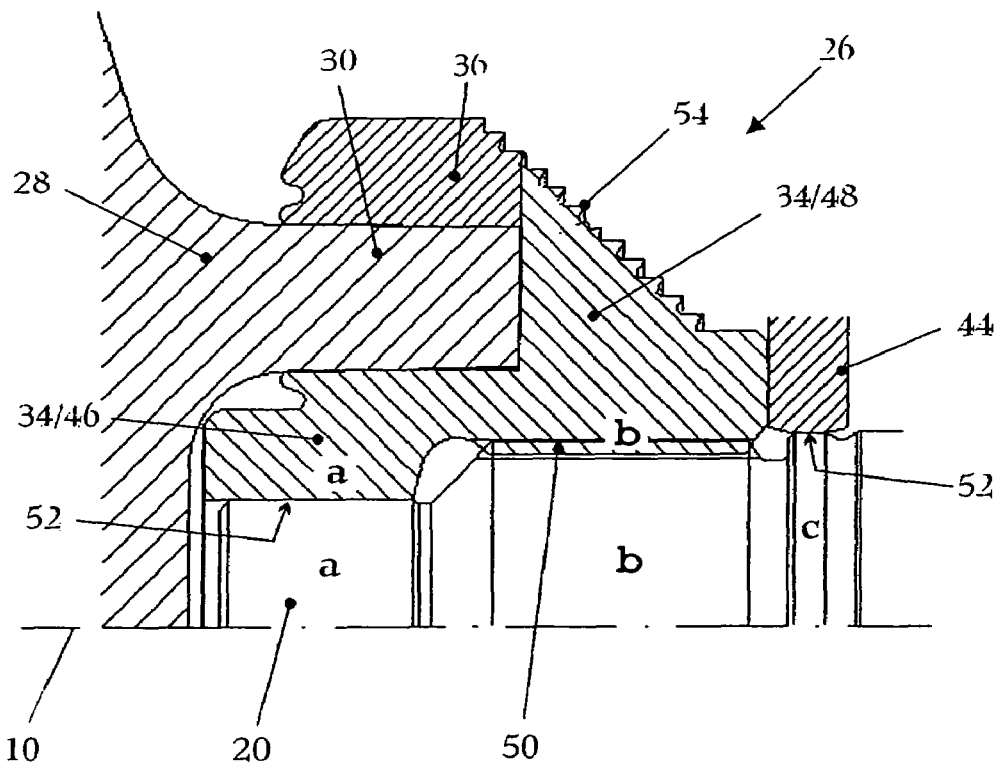

As the embodiment from FIG. 6 shows, the bush 34 may also have only two sections a, b having different inside diameters, the thread 50 being arranged on the shaft-side section b having the larger inside diameter, and the centering surface 52 being arranged on the impeller-side section a having the smaller inside diameter. The shaft journal 20 is again of diametrically opposed design, but has on the shaft side an additional section c having a centering surface 52 for the auxiliary bearing 44. The annular flange 48 of the bush 34 projects radially beyond the hub extension 30 and engages behind the press sleeve 36.

Although this is nowhere shown explicitly in the figures, the hub extension 30 may also be designed to widen conically toward the impeller 22. This may be advantageous for the frictional connection between hub extension 30 and press sleeve or bush. The features of the fastening arrangement 26 according to the invention which are shown in the individual FIGS. 1 to 6 may be combined with one another more or less in any desired manner. However, the thread 50 for screwing onto the shaft journal 20 is advantageously located on a section of large diameter and corresponds approximately to one third to two thirds of the radially inner axial extent of the bush 34. The number of centering surfaces may also be larger than 2 if this is appropriate on account of the geometry of the impeller 22 and of its hub extension 30 or if, in addition to the auxiliary bearing 44, even further elements requiring centering are to be arranged between hub extension 30 and bearing element 16. More than only one thread may also be provided. Bush 34 and press sleeve 36 may also be designed in one piece. However, this imposes high demands on the production of the component 34/38 and on the making of the frictional connection to the hub extension 30. Bush 34 as well as press sleeve 36 are pressed or shrunk onto the hub extension 30 before the fitting of the impeller 22. The impeller 22 together with the press sleeve 36 and the bush 34 is then screwed onto the shaft journal 20 by means of the thread 50 in the bush 34.

LIST OF DESIGNATIONS

10 Longitudinal axis
12 Compressor side of the turbocharger
14 Shaft
16 Bearing element
18 Bearing housing
20 Shaft journal
22 Impeller/compressor wheel
24 Moving blades
26 Fastening arrangement
28 Hub
30 Hub extension
32 Recess
34 Bush
36 Press sleeve
38 Intermediate wall
40 Compressor space
42 Bearing space
44 Auxiliary bearing
46 Bush sleeve
48 Annular flange
50 Thread
52 Centering surface
54 Labyrinth seal
56 Labyrinth serrations
58 Sleeve part
60 Shaft-side region
62 Annular flange
64 Broken line
66 Shoulder

The invention claimed is:

1. A fastening arrangement for an impeller on a shaft, in particular for an impeller of a turbocharger on a turbocharger shaft, comprising a bush, which can be screwed onto a shaft journal of the shaft, and a shaft-side hub extension of the impeller having a central recess, into which the bush can be inserted in a frictional manner, the hub extension, at least in the region of its shaft-side end, being designed in the form of an approximately cylindrical hollow body, wherein a press sleeve frictionally connected to the hub extension is provided radially on the outside on the hub extension, and in that the hub extension is clamped in place frictionally between bush and press sleeve.

2. The fastening arrangement as claimed in claim 1, wherein an auxiliary bearing is provided which is arranged axially between a bearing element supporting the shaft and the hub extension and in the fitted state preferably bears against part of the bush or part of the press sleeve.

3. The fastening arrangement as claimed in claim 1, wherein the impeller, in the fitted state, is separated on the shaft side from the bearing space by means of a fixed intermediate wall, and the intermediate wall engages on the shaft side radially behind the hub extension together with bush and press sleeve.

4. The fastening arrangement as claimed in claim 3, wherein a seal, preferably a labyrinth seal, is provided between press sleeve and intermediate wall and/or between bush and intermediate wall.

5. The fastening arrangement as claimed in claim 4, wherein those sides of press sleeve and/or bush which are adjacent to the intermediate wall are designed at least partly as the one part of a labyrinth seal, and wherein a side of the intermediate wall which faces the shaft journal is designed at least partly as the other part of the labyrinth seal.

6. The fastening arrangement as claimed in one of the claim 1, wherein one or more centering surfaces are provided on the outer circumference of the shaft journal, these centering surfaces interacting in a centering manner with one or more centering surfaces on the inner circumference of the bush, and wherein one or more threads are arranged on the outer circumference of the shaft journal and the inner circumference of the bush axially adjacent to the centering surfaces, these threads interacting in a positive-locking manner, the axial extent of the thread(s) corresponding approximately to one third to two thirds of the radially inner axial extent of the bush.

7. The fastening arrangement as claimed in claim 1, wherein the bush has sections having a different inside diameter axially one behind the other, the inside diameters decreasing toward the impeller, and an internal thread for screwing onto the shaft journal, which is of diametrically opposed design, is arranged on a section having a large diameter.

8. The fastening arrangement as claimed in claim 1, wherein the bush has an axially extending bush sleeve and an annular flange projecting radially outward, the flange, in the fitted state, bearing against the shaft-side end face of the hub extension and preferably having an outside diameter which corresponds approximately to the outside diameter of the hub extension.

9. The fastening arrangement as claimed in claim 1, wherein the press sleeve has an axially extending sleeve part and an annular flange projecting radially inward, the annular flange, in the fitted state, bearing against the shaft-side end face of the hub extension and preferably having an inside diameter which corresponds approximately to the inside diameter of the central recess in the hub extension.

10. The fastening arrangement as claimed in claim 8, wherein the annular flange of the press sleeve and the annular flange of the bush touch one another radially in the fitted state or are designed with shoulders in such a way that they engage radially one inside the other in a positive-locking manner, or wherein only the press sleeve or only the bush has a flange and this flange preferably extends radially in such a way that it engages behind the bush sleeve of the bush or the sleeve part of the press sleeve.

11. A turbocharger having an impeller, the impeller being formed of a first material and being mounted on a turbocharger shaft by means of a bush that is an interference fit in the impeller, the bush comprising a second material, and a press sleeve comprising a material capable of thermal shrinkage fitting against the first material, the press sleeve surrounding at least a part of an axial length of the impeller that overlies the bush, thereby to maintain the interference between the bush and the impeller during use of the turbocharger over its operating speed and temperature range.

12. The turbocharger according to claim 11, wherein the press sleeve extends over at least most of the length of an interface connection between the bush and the impeller.

13. The turbocharger according to claim 11, wherein an abutment is provided on the bush to prevent axial movement of the press sleeve on a hub of the impeller.

14. The turbocharger according to claim 11, wherein the press sleeve is provided with a circumferential land in its outer surface and matched to a labyrinth seal to cooperate with static structure of the turbocharger.

15. The turbocharger according to claim 14, wherein a labyrinth seal on an intermediate wall cooperates with the land to define a groove.

16. The turbocharger according to claim 15, wherein the labyrinth seal serves to prevent axial movement of the press sleeve.

17. An impeller for a turbocharger, comprising a hub of a first material and a bush that is an interference fit in the hub for receipt of a shaft of the turbocharger, the bush comprising a second material, the hub having mounted thereon a press sleeve of a material capable of thermal shrinkage fitting against the first material, the press sleeve surrounding at least a part of an axial length of the impeller that overlies the bush, thereby to maintain the interference between the bush and the impeller during use of the turbocharger over its operating speed and temperature range.

18. The impeller according to claim 17, wherein the press sleeve extends over at least most of the length of an interface connection between the bush and the impeller.

19. The impeller according to claim 17, wherein an abutment is provided on the bush to prevent axial movement of the press sleeve on the impeller hub.

20. The impeller according to claim 17, wherein the press sleeve is provided with a circumferential land in its outer surface matched to a labyrinth seal to cooperate with static structure of the turbocharger.

21. The impeller according to claim 20, wherein a labyrinth seal on an intermediate wall cooperates with the land to define a groove.

22. The impeller according to claim 21, wherein the labyrinth seal provides an abutment to prevent axial movement of the press sleeve.

* * * * *